United States Patent [19]
Lange et al.

[11] 3,802,842
[45] Apr. 9, 1974

[54] TEST STRIPS

[75] Inventors: Hans Lange, Lampertheim; Walter Rittersdorf, Mannheim-Waldhof; Hans-Georg Rey, Mannheim-Waldhof; Peter Rieckmann, Mannheim-Waldhof, all of Germany

[73] Assignee: Boehringer Mannheim GmbH, Mannheim, Postfach, Germany

[22] Filed: Mar. 2, 1972

[21] Appl. No.: 232,315

[30] Foreign Application Priority Data
Apr. 16, 1971 Germany............................ 2118455

[52] U.S. Cl. ..................23/253 TP, 116/114 AM, 195/103.5 R
[51] Int. Cl. ......................................... G01n 31/22
[58] Field of Search ......... 23/253 TP; 116/114 AM; 99/192 TI; 195/103.5 R

[56] References Cited
UNITED STATES PATENTS

| | | | |
|---|---|---|---|
| 2,249,867 | 7/1941 | Snelling...................... | 23/253 TP X |
| 3,078,182 | 2/1963 | Crone, Jr. et al. .......... | 116/114 AM |
| 3,094,373 | 6/1963 | Luechauer.................. | 23/253 TP X |
| 3,127,281 | 3/1964 | Meyer............................. | 23/253 TP |
| 3,232,710 | 2/1966 | Rieckmann et al....... | 195/103.5 R X |
| 3,346,464 | 10/1967 | Ernst........................... | 23/253 TP X |
| 3,531,254 | 9/1970 | Okuda......................... | 23/253 TP X |
| 3,067,015 | 12/1962 | Lawdermilt.................. | 23/253 TP |

Primary Examiner—Robert M. Reese
Attorney, Agent, or Firm—Burgess, Dinklage & Sprung

[57] ABSTRACT

Test strips for the detection of components in liquids, especially in body fluids, comprising a holder and at least one indicator layer containing detection reagents wherein one surface of the layer is attached to the holder and the other surface is covered with a fine meshwork.

22 Claims, 6 Drawing Figures

PATENTED APR 9 1974 3,802,842

TEST STRIPS

The present invention relates to test strips for the detection of components in liquids, especially in body fluids, and to the use of such test strips.

Reagent papers have been in use for a long time, pH indicator papers being the most widely used but other reagent papers are also employed: for example, curcuma paper is used for the detection of acids, potassium iodide-starch paper for the detection of oxidation agents and lead acetate paper for the detection of sulfides. Recently, test papers have also achieved considerable importance in the field of clinical chemistry. They permit the rapid, easy and semi-quantitative determination of pathological components, such as glucose, protein and the like, in body fluids, such as urine, serum and the like. Furthermore, since test papers of this type are used to an ever greater extent by lay persons, it has proved to be necessary to bring the test papers, which merely consist of impregnated filter paper, into a form which is safer to use and with which disturbances of the detection reaction can be avoided.

One of the most common sources of disturbances are faulty reactions of the test papers, brought about by contact with the hands or by external influences, for example moisture and autoxidation. In order to avoid touching the test paper, it is now usual to afix the test paper, in the form of a small rectangle, on to a strip of plastics material which not only serves as a handle but also simultaneously results in the saving of reagents, which are often expensive.

For the protection of sensitive reagents against the action of atmospheric moisture, oxygen and the like, the test zones have also been sealed between synthetic resin foils in such a manner that the liquid to be investigated can only reach the test zone via the uncovered edges of the test zone (cf. published German Patent Specification No. 1,546,307). This method provides good protection for the test paper but, nevertheless, it is necessary to put up with some serious disadvantages, the avoidance of which has hitherto not been successful, in spite of intensive efforts. While the test papers in the test strips according to published German Patent Specification No. 1,546,307 are, surprisingly, also rapidly and completely wettened with liquid, even when dipped into the test liquid for only a short time, it is possible for air bubbles to be formed between the paper and the synthetic resin foil, which can considerably complicate the evaluation of the coloration of the test zone. Furthermore, it can sometimes happen that, in the case of lateral penetration of liquid, disturbing chromatographic effects can occur, resulting in a non-uniform coloration of the test zone, which is difficult to evaluate.

In order to overcome these deficiencies at least partially, the protective synthetic resin foils have been provided with holes as disclosed in published German Patent Specification No. (DOS) 1,546,307. Such test strips appear to the observer to be coarsely rastered since, for technical reasons, per test zone there can only be punched into the foil at most 25 holes with a minimum diameter of 0.5 mm. The result is that a well-defined reading off of the color can no longer be guaranteed. On the other hand, fine perforations in punched foils tend to close up again because of the cold flow of the synthetic resin; furthermore, perforations give rise to unevennesses of the foil and thus result in disturbing reflections of the surface.

A further attempt to solve the problems which occur resulted in the provision of a comparatively large intermediate space between the test paper and the synthetic resin foil as shown in published German Patent Specification No. (DOS) 1,940,964. However, this results in increased bleeding effects, especially in the case of comparatively long immersion or in the case of investigations in flowing liquids, especially in a stream of urine; furthermore, the production of the test strips according to said DOS 1,940,964 is relatively complicated and thus expensive.

Surprisingly, we have now succeeded in producing test strips which, in comparison with those previously known, represent a significant advance since they do not suffer from the known disadvantages and, in addition, possess a number of additional advantages.

It has been found that particularly stable, non-bleeding, contact-safe and delay-free indicator test strips for the detection of components present in body fluids are obtained when at least one indicator layer containing the detection reagents and connected to a holding means is covered with a fine meshwork.

Essentially, the test strips of the instant invention comprise at least one indicator layer containing detection reagents attached to a holding means on one side and covered with a fine meshwork on the other.

According to the present invention, there is provided a test strip for the detection of components present in liquids, especially in body fluids, comprising a holding means and at least one indicator layer containing detection reagents, the surface of which layer not adjacent to the holding means being provided with a covering, whereby the narrow edges of the indicator layer can be uncovered, which covering consists of a fine meshwork.

Surprisingly, the fine meshwork protects the underlying indicator layer against manual contact and against external influences, although the holes in the meshwork can amount to 50 percent and more of the total surface area of the meshwork. Since the liquid to be investigated penetrates not only via the edges of the indicator layer but preponderantly through the holes of the meshwork, disturbing chromatographic effects can no longer occur. For this reason, it is now not only possible but, indeed, advantageous to apply the meshwork very closely to the indicator layer.

It was to have been expected that the use of a meshwork as a covering for the indicator layer would, because of insufficient covering, lead to a no longer acceptable increase of the bleeding effect, especially in the case of using the test strip in a stream of urine. However, we have, surprisingly, found that the opposite is the case and that the meshwork acts strongly counter to this type of disturbance to such an extent that the test strips according to the present invention, even in the case of very considerable wetting, such as by prolonged immersion in urine or by wetting in a stream of urine, are not washed out. It is also surprising that the reading off of even very slight color changes is in no way impaired by the meshwork; on the contrary, the meshwork brings about an equalization of the color shade produced, which is pleasant to the eye and readily evaluable, the structure of the meshwork thereby not appearing. A further advantage of the test strips according to the present invention is the immeasurably rapid wetting of the indicator layer which gives a delay-free, readable color reaction. Thus, the test strips according to the present invention can provide, for the first time, reproducible analytic values which are independent of the time of immersion. This signifies a considerable increase in the degree of certainty in the use of the test strips.

For a better understanding of the present invention, several embodiments thereof will now be described in more detail, with reference to the accompanying drawings, in which.

Figure 1:
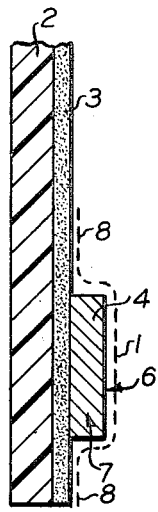
FIG. 1 is an enlarged cross-section of the lower part of a test strip according to the present invention.
Figure 2:
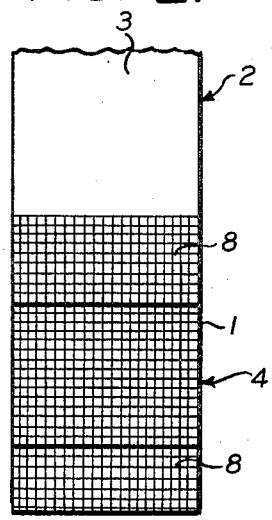
FIG. 2 is an enlarged front view of the lower part of a test strip according to the present invention.

In FIGS. 1 – 6 of the accompanying drawings, on to a holder 2, which preferably consists of a stiff or rigid synthetic resin foil, there is applied an adhesive layer 3, which completely or partially covers the surface of the holder 2. At least one indicator layer 4 is provided on the lower end of the holder 2, one surface of the layer 4 being either in direct contact with the holder 2 or with the adhesive layer 3.

A meshwork 1, which is of larger dimensions than the indicator layer 4, covers the surface area 6 of the indicator layer 4 which is not facing the holder, peripheral zones 8 of the meshwork 1 projecting beyond the indicator layer 4 and being firmly connected, by means of the adhesive layer 3, with the holder 2. The meshwork 1 preferably lies directly upon the indicator layer 4 so that the intermediate space between the meshwork 1 and the indicator layer 4 is kept as small as possible.

The holder 2 is preferably made from a synthetic resin, for example, polystyrene, polyvinyl chloride, a polyester or a polyamide. However, it is also possible to impregnate an absorbent material, for example wood, paper or cardboard, with a water-repellent material or to cover an absorbent material with a water-resistant film. As hydrophobing agents, there can thereby be used, for example, silicones or hard fats, and as film-forming agents, there can be used, for example, nitrocellulose or cellulose acetate. Other examples of carrier materials which can be used include metal foils and glass. The carrier materials can be colorless and transparent but advantageously there are used opaque materials which, for increasing the color contrast, can also be appropriately colored.

The adhesive layer consists, for example, of a hot-sealable material, for example, polyethylene, a fusion adhesive or a cold hardenable adhesive. There can, indeed, be used any layer which securely bonds the meshwork 1, in the production of the test strips, to the holder 2 when, after the production, it can be completely hardened thermally, chemically or by drying processes with sufficient speed. The hardening of the adhesive layer 3 is necessary because the peripheral zones 8 of the meshwork 1 are, in many cases, completely embedded in the adhesive layer 3. In such cases, the adhesive layer passes through the holes in the meshwork and covers the meshwork 1 on the upper side thereof.

The indicator layer preferably consists of an absorbent carrier, for example, filter paper or synthetic resin fleece, impregnated with detection reagents and possibly with adjuvants, for example, buffers or wetting agents. The indicator layer is normally applied to foils of holder material in the form of bands. However, it is also possible to mix the detection reagents with neutral solid materials and optionally with binding agents and a solvent and to coat the holder material with the paste so obtained, followed by drying. As neutral solid materials, there can be used, for example, cellulose or gypsum. Furthermore, the indicator layer can consist of a water-resistant film according to U.S.-Pat. No. 3,630,957.

The meshwork 1 can consist of regularly woven filaments in the form of a fabric with weft and warp threads or can be in the form of an unwoven fabric. It is also possible to use thin felt- or fleece-like meshwork 1, in which the fibre structure is not uniform, provided that they have the necessary transparency and stability. It is preferred to use synthetic resin fabrics of monofile or spun filaments which can consist of cellulose materials, for example cotton, cellulose, flax or sisal, proteinaceous materials, for example, wools or silk, or synthetic resins, for example polyamides, polyesters, polyethylene, polypropylene, polyvinyl chloride or polyacrylonitrile, or of a large variety of co-polymers. In some cases, it is also possible to use fine metallic fabrics. The thickness of the fibres used is expediently 5 – 200 $\mu$ and preferably 20 – 100 $\mu$, the open surface of the holes expediently being 30 – 80 percent, preferably 40 – 60 percent, of the total surface area. Within the given limits, the meshwork can be varied, depending upon the color reaction of the indicator layer. Normally, there are used meshwork of colorless material. However, with colored meshwork, there are obtained mixed colors with the colors of the indicator layer, which can sometimes increase the contrast. In addition, it is also possible to impregnate the meshwork with reagents which only penetrate into the indicator layer upon wetting. This separate impregnation is recommended when there is a possibility that two or more detection reagents and/or adjuvants might react together during storage.

The connection of the meshwork 1 with the adhesive layer 3 can, depending upon the nature of the material used, be carried out by the application of pressure and/or by heating or by high frequency or ultrasonically. If the carrier 2 consists of a softenable synthetic resin, for example polyvinyl chloride, then this can itself serve as the adhesive layer 3. The connection with the meshwork 1 then takes place by direct welding or by pressure after swelling the surface with a suitable solvent, for example with methylene chloride. The meshwork can, however, also be connected, for example, by partial sealing also only with the indicator layer 4.

The test strips according to the present invention are preferably produced in the following manner: broad bands of holder foil are provided with the adhesive layer 3, together with narrow bands of reagent paper, which is used as indicator layer 4, and somewhat broader bands of the meshwork 1 are thermally sealed together along the projecting surfaces 8, whereafter the resulting test strip band is cut transversely into test strips of the desired width.

Figure 4:
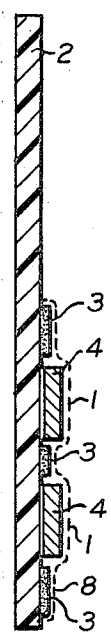
FIGS. 4 and 6 show test strips according to the present invention, each having two indicator layers.
Figure 5:
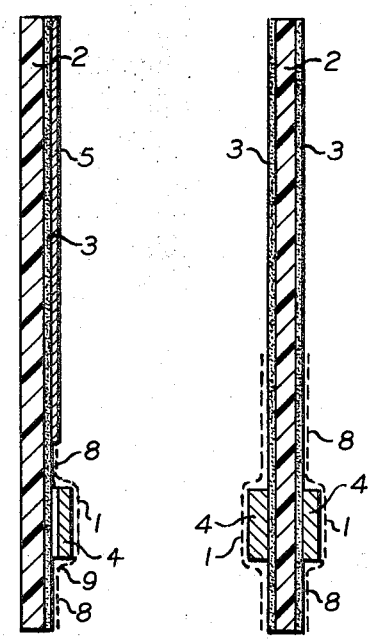
Figure 6:
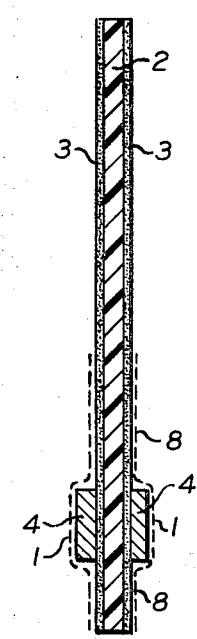

Depending upon whether it is desired to produce mono-or multi-test strips, one or more indicator layers 4 can be applied in parallel bands to the holder foil 2. FIGS. 4 and 6 of the accompanying drawings illustrate embodiments of twofold test strips. The cut surface 7 of the indicator layer resulting from the cutting of the above-mentioned test strip bands need not be covered with the meshwork 1 because the free edge surface 7 is relatively small.

In a particular embodiment of the test strips according to the present invention (cf. FIG. 5 of the accompanying drawings), below the indicator layer 4, i.e., between the indicator layer 4 and the holder 2 of adhesive layer 3, is placed an absorbent material 9, which does not contain any reagents. In some cases, this increases sensitivity of the indicator layer and protects it against possible adverse effects of the adhesive layer.

Figure 3:
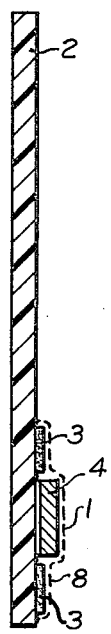
FIGS. 3 and 5 show test strips according to the present invention, each having one indicator layer.

In FIGS. 3 and 4 of the accompanying drawings, the adhesive layer 3 is applied to the holder 2 in the form of narrow strips. In this way, there is avoided any undesired contact between the reagents with substances in the adhesive layer. If the carrier foil is covered completely or preponderantly with the adhesive layer 3, this can be used additionally to fix to the carrier 2 a covering foil 5 (see FIG. 5 of the accompanying drawings) provided, for example, with instructions or comparative colors.

The test strips according to the present invention are particularly useful for the investigation of body fluids, especially of urine; however, in the case of appropriate modification of the detection reagents, they can also be of quite general applicability. It is obvious that turbid liquids, such as blood or urine with a high content of sediment, must possibly be centrifuged or filtered before carrying out the investigation. Since the test strips according to the present invention are very quickly and easily wettened, it is even possible to analyse, without any time delay, viscous liquids, for example serum or secretions from or on mucous membranes, for example saliva.

The following Examples are given for the purpose of illustrating the present invention:

EXAMPLE 1.

pH Test Strips

Filter paper (Schleicher & Schüll No. 2316) was impregnated with the following solution:

| methyl red | 0.08 g. |
| bromothymol blue | 1.00 g. |
| methanol | ad 1000 ml. | dried in a current of warm air and cut into strips with a width of 6 mm.

These bands were sealed, by means of hot rollers, between a 60 mm. wide band of melt wax-coated polyester foil and a 12 mm. wide band of polyester fleece (15 g./m$^2$) in such a manner that the middle of the test paper came to lie 6 mm. from the lower edge of the polyester band and below the middle of the fleece band. The hot rollers used were provided with recesses corresponding to the position of the test paper. If, under the pH test paper, there was laid a conventional filter paper of the same width, then the recesses on the hot rollers could be omitted.

The finished sealed band was then cut transversely into strips of 6 mm. breadth.

When these test strips were dipped into solutions of pH 5 – 8, then, depending upon the pH, there were obtained colorations from yellow to blue which extended uniformly over the whole of the test area.

When the pH test paper was sealed in conventional manner between polyethylene-coated polyester foils then, due to chromatographic effects and air bubbles, under unfavorable conditions, disturbances can occur.

EXAMPLE 2.

Protein Test Strips

Filter paper (Schleicher and Schüll No. 2,316) was successively impregnated with the following solutions:

| I | sodium citrate | 130.6 g. |
| | citric acid | 46.6 g. |
| | lauroyl sarcosine | 0.8 g. |
| | water | 500.0 g. |
| | methanol | ad 1000 ml. |
| II | magnesium sulfate | 59.4 g. |
| | tetrabromophenolphthalein ethyl ester | 0.5 g. |
| | methanol | ad 1000 ml. | dried and cut up into 6 mm. wide strips.

The test paper was sealed between polyester foil and fleece and cut transversely in the manner described in Example 1.

When the test strips thus obtained were dipped into protein-containing urins, then uniformly green and blue colorations of the test zone were obtained. When the test strips were held for 5 seconds in a stream of urine, then the same color was obtained as in the case of being dipped into the same urine. In particular, protein-free urine gave a negative reaction in both cases, this being indicated by a pale yellow color. Conventional sealed in or sealed on test strips can, in contradistinction thereto, indicate a faintly positive reaction due to washing out effects.

EXAMPLE 3.

Combined Protein and pH Test Strips pH and protein test papers were produced in the manner described in Example 1 and 2 and sealed in such a manner that they came to lie on the same test strip next to one another at a distance of about 3 mm.

When these test strips were dipped into appropriate test solutions, then the same colors were obtained as with the corresponding single test strips. These colorations also do not change over a comparatively long period of time.

When, however, the test papers were only sealed on next to one another, then, shortly after dipping into the test solution, the side of the protein test zone nearest to the pH test zone becomes more deeply green colored, whereas the corresponding side of the pH test zone took on a color corresponding to a more acidic pH value. These results were due to a diffusion of the acidic buffer from the protein test zone to the pH test zone through the connecting film of liquid.

EXAMPLE 4.

Urobilinogen Test Strips.

Filter paper (Schleicher & Schüll No. 2312) was impregnated with a solution of the following composition:

| 4-cyclohexylaminobenzaldehyde | 1.0 g. |
| oxalic acid | 200 g. |
| methanol | ad 1000 ml. | dried and cut up into 6 mm. wide bands.

The test paper band was, in the manner described in Example 1, sealed in between bands of polyethylene-coated polyester foil and nylon fabric (60 μ filament thickness, 45 percent free hole surface) and cut transversely.

When these test strips were dipped into urobilinogen-containing urine, then a completely uniform red coloration of the test zone was formed which permitted a reproducible, semi-quantitative determination of the urobilinogen.

When the test paper was sealed between two polyethylene-coated polyester foils and only dipped briefly into the urine, then red strips were only obtained on the open edges of the test zone, whereas the middle remained white.

EXAMPLE 5.

Glucose Test Strips.

Filter paper (Schleicher & Schüll No. 23 SL) was impregnated with the following solution:

| | |
|---|---|
| o-tolidine | 4 g. |
| peroxidase | 0.12 g. |
| glucose oxidase | 13.0 g. |
| tartrazine | 0.9 g. |
| ethanol (44%) | ad 1000 ml. | dried and cut up into 6 mm. wide bands.

On to a polyvinyl chloride band of 60 mm. breadth were applied, from two nozzles, on the lower edge and at a distance of 10 mm. therefrom, 3 mm. strips of an air-hardenable cyanoacrylate adhesive. Shortly thereafter, the test paper was laid between the strips and a 12 mm. wide band of polyester fabric (30 μ filament thickness and 45 percent free hole surface) stuck thereover. After hardening of the adhesive, the whole band is cut up transversely into strips of 6 mm. breadth.

When these test strips were dipped into glucose-containing solutions, for example into urine, then, depending upon the glucose content, there was obtained a uniform, more or less green coloration of the test zone.

When the test strips were sealed, in conventional manner, between two polyethylene-coated polyester foils and then dipped into urine, then there was formed an air bubble with a dark green color fleck which was brought about by the stronger atmospheric oxidation of this area.

EXAMPLE 6.

Hydrogen Peroxide Test Strips.

A mixture of the following composition:

| | |
|---|---|
| polyvinyl propionate dispersion | 45.0 g. |
| phosphate buffer 0.4M (pH 5.5) | 45.0 ml. |
| sodium alginate | 0.5 g. |
| sodium lauryl sulfate | 0.6 g. |
| o-tolidine | 0.2 g. |
| peroxidase | 0.02 g. |
| methanol | 6.0 g. | was coated with a layer thickness of 350 μ, on to a polyvinylidene chloride-coated paper and dried.

6 mm. wide bands of this paper provided with a reagent film were, as described in Example 5, stuck over with a nylon fabric (60 μ filament thickness and 45 percent free hole surface).

When the test strips of this type were dipped into hydrogen peroxide-containing solutions, then a uniformly blue coloration was obtained, the depth of which depended upon the hydrogen peroxide concentration.

When, on the other hand, the paper provided only with the reagent film was briefly dipped into the liquid and then removed immediately, there was obtained a non-uniform reaction, since the liquid was not uniformly distributed on the surface of the film.

EXAMPLE 7.

Nitrite Test Strips.

Filter paper (Schleicher & Schüll No. 2316) was impregnated with a solution of the following composition:

| | |
|---|---|
| sulfanilamide | 2.0 g. |
| α-naphthylamine | 1.2 g. |
| tartaric acid | 25.0 g. |
| methanol | ad 1000 ml. | dried and cut up into 6 mm. wide bands.

The test paper was, as described in Example 1, sealed between a melt wax-coated polyester foil and a nylon fabric and cut up into 6 mm broad strips.

After dipping into nitrite-containing test liquids, the test strips showed more or less red colorations. They were especially readily usable in strongly viscous solutions, such as occur in the production of sugar. Nitrite test papers sealed between polyethylene-coated polyester foils cannot be used for this purpose.

It will be understood that the specification and examples are illustrative but not limitative of the present invention and that other embodiments within the spirit and scope of the invention will suggest themselves to those skilled in the art.

What is claimed is:

1. Test strip for the detection of components in liquids comprising holding means and at least one indicator layer containing detection reagents, wherein one surface of the indicator layer lies on a portion of said holding means and the remainder of said indicator layer is substantially covered with a covering consisting of a fine meshwork wherein the open surface area of the holes is 30 to 80 percent of the total surface area of said meshwork.

2. Test strip as claimed in claim 1 wherein the surface of said indicator layer not lying on said holding means is covered with said fine meshwork covering and wherein the edges of the indicator layer are uncovered.

3. Test strip as claimed in claim 1 wherein the surface of said indicator layer not lying on said holding means is covered with said fine meshwork covering and wherein the longitudinal edges of the indicator layer are uncovered.

4. Test strip as claimed in claim 1 wherein said open surface is 40 to 60 percent of the total surface area.

5. Test strip as claimed in claim 1 wherein the meshwork is a nonwoven or a woven fabric.

6. Test strip as claimed in claim 1 wherein the indicator layer consists of an absorbent paper or fleece.

7. Test strip as claimed in claim 1 wherein said holding means is a synthetic resin strip.

8. Test strip as claimed in claim 1 wherein said holding means is a strip of an absorbent material impregnated or coated with a water-repellant material.

9. Test strip as claimed in claim 1, wherein the covering consists of a synthetic resin fabric with a filament thickness of 5 to 200 microns.

10. Test strip, as claimed in claim 9, wherein the covering consists of synthetic resin fabric with a filament thickness of 20 to 100 microns.

11. Test strip as claimed in claim 1 wherein at least two indicator layers lie on said holding means.

12. Test strip as claimed in claim 11 wherein the holding means is a flat strip and at least two indicator layers lie on the same surface of the flat strip holding means.

13. Test strip as claimed in claim 11 wherein the holding means is a flat strip and at least two indicator layers lie on the opposite surfaces of the flat strip holding means.

14. Test strip as claimed in claim 11 wherein said covering extends over all of said indicator layers and projects beyond the two end indicator layers, and is adhered to said holding means by adhesive strips disposed transversely between adjacent indicator layers and beyond the two end indicator layers.

15. Test strip as claimed in claim 1 wherein said covering projects beyond said indicator layer and wherein peripheral zones of said covering projecting beyond the indicator layer are adhered to said holding means.

16. Test strip as claimed in claim 15 wherein said holding means is elongated and said covering projects longitudinally beyond said indicator layer.

17. Test strip as claimed in claim 16, wherein projecting zones of said indicator layer are adhered to the holding means by means of an adhesive layer disposed between said projecting zones and the holding means.

18. Test strip as claimed in claim 15 wherein an adhesive layer is provided between said holding means and said indicator layer and said adhesive layer extends beyond said surface to adhere said peripheral zones to the holding means.

19. Test strip as claimed in claim 18 wherein an additional absorbent layer is disposed between said adhesive layer and said indicator layer.

20. Method of detecting components in liquids, which method comprises contacting the liquid to be analyzed with a test strip comprising holding means and at least one indicator layer containing detection reagents, wherein one surface of the indicator layer lies on a portion of said holding means and the remainder of said indicator layer is substantially covered with a covering consisting of a fine meshwork wherein the open surface area of the holes is 30 to 80 percent of the total surface area of said meshwork.

21. Method as claimed in claim 20 wherein said liquids are body fluids.

22. Method as claimed in claim 20 wherein the surface of said indicator layer not lying on said holding means is covered with said fine meshwork covering and wherein the edges of the indicator layer are uncovered.

* * * * *